Patented Feb. 20, 1934

1,947,868

UNITED STATES PATENT OFFICE 1,947,868

TREATMENT OF HYDROCARBON OILS

Jacque C. Morrell and Gustav Egloff, Chicago, Ill., assignors to Universal Oil Products Company, Chicago, Ill., a corporation of South Dakota No Drawing. Application February 16, 1931
Serial No. 516,273

4 Claims. (Cl. 196—36)

This invention relates to the treatment of hydrocarbon oils and refers more particularly to the refining of relatively low boiling hydrocarbon distillates at elevated temperatures, especially those resulting from the conversion of relatively high boiling hydrocarbons at elevated temperatures.

More specifically the invention comprises subjecting hydrocarbon oil vapors to treatment with mixtures of sulphur dioxide, oxygen-containing gases and steam in the presence of solid contact materials of a nonmetallic nature such as fuller's earth, clays, bentonite, bauxite, crushed firebrick, pumice stone and other materials of an earthy or siliceous nature. As examples of oxygen-containing gases air, oxygen, ozone alone or in combination may be mentioned, ozonized air having been found to be particularly useful in some instances.

In some cases the contact masses may be mixed with minor amounts of materials of a basic nature such as metals or their oxides these resulting in some instances from the decomposition of salts of the metals incorporated with the earthy materials prior to their roasting and in other instances from the disintegration reactions of the earthy materials during their use in the process. The effect of the bases may be of a chemical or merely of a catalytic nature.

The invention is more particularly directed to the treatment of vapors of lower boiling cracked distillates although the straight run distillates may also be treated within the scope of the invention.

The usual method of refining cracked distillates is to subject them to treatment with sulphuric acid and alkaline solutions, including plumbite solutions consisting of litharge dissolved in alkaline solutions in various combinations of treatment and subsequently to subject the acid treated product to redistillation usually in the presence of steam. The present invention permits the direct treatment of the hydrocarbon vapors from the cracking process, reducing the cost of reagents and eliminating the redistillation or rerunning operation, although it is within the scope of the invention to revaporize the product in a subsequent operation and subject the vapors to treatment as described.

In applying the process of the invention to practice any suitable equipment may be employed which will permit the contacting of the hydrocarbon vapors and the treating gases employed with the solid contacting or polymerizing materials; for example, a suitable tower or chamber packed with a selected mixture of contact materials may be employed following the fractionator of a cracking system, the gaseous reagents being introduced at a suitable point or points along the line of flow of the ascending or descending vapors thus permitting contact with the solid materials of the mixture of hydrocarbon oil vapors and the gaseous treating mixtures. Similarly any device which permits the efficient contacting of the hydrocarbon vapors undergoing treatment with the gases and solids may be employed. The solid contacting materials may sometimes be employed in successive strata of varying composition, or may be supported on superimposed plates designed to produce intimate contact.

It has been found desirable to neutralize the vapors before or after condensation and to this end the vapors may be treated with ammonia gas or pass counterflow to solutions of alkalies in auxiliary neutralizing equipment or the condensed vapors may be treated with liquid alkalies such as solutions of caustic soda, ammonia or the like, the traces of reagents and reaction products remaining being washed out with water when found necessary.

The reactions involved in treatments conducted within the scope of the invention have been observed to produce effects substantially equivalent to that produced by the use of liquid sulphuric acid employed after the more customary methods of treatment. The amounts of reagents used will vary with the character of the vapors treated and may vary from a fraction of a percent by weight to as high as 10% in cases where relatively heavy treatments are desired. The proportions of sulphur dioxide, oxidizing gas, and steam may also be varied to produce a wide variety of treating effects. While the reactions involved in treatments comprised within the scope of the invention are generally those of polymerization or condensation resulting from primary oxidizing of unsaturated hydrocarbons, other reactions occur in which the sulphur dioxide combines with and removes undesirable constituents either as such or after oxidation.

Various temperatures of treatment may be employed, for example, from 250–600° F., more or less, and the pressures may be subatmospheric, atmospheric, or superatmospheric. While the results may vary with the conditions employed, the pressures and temperatures are chosen so that the hydrocarbons are treated substantially in the vapor phase.

As specific examples of the operation of the process of the invention and of the results obtained, a California cracked distillate of approximately motor fuel boiling range may be vaporized and subjected to treatment with a mixture of sulphur dioxide, oxygen and steam during the passage of the vapors through a stationary mass of finely divided clay in a downward direction. The sulphur dioxide may be used in an amount equivalent to approximately 4 pounds per barrel, with oxygen slightly in excess of that necessary for its complete oxidation to sulphur dioxide. Steam is used at the rate of approximately 2 pounds per barrel. The untreated product may show a gum content of approximately 500 mgs. per 100 ccs. and have a reddish brown color, with a sulphur content of approximately 0.25%. The treated product after suitable separation from spent reagents, neutralizing with alkalies and washing with water may show a gum content of approximately 30 mgs. and a color of 25 on the Saybolt scale. The sulphur content may be found to be as low as 0.1%.

In the case of a mixed Mid-Continent and West Texas cracked distillate treated with approximately the same amounts of reagents, the gum content may be reduced from 300 mgs. to 11 and the color raised from a light amber to approximately 30 on the Saybolt scale. The sulphur content may be reduced from 0.4% to approximately 0.15%.

The process of the invention is particularly suitable to the treatment of cracked distillates produced from California oils. In some cases the untreated distillates may contain 600 mgs. of gum and have a dark reddish color while the treated distillates may have a gum content of only 50 mgs. and a color of 25 to 30 on the Saybolt scale. The sulphur content may be reduced from 0.5% to 0.22%.

The foregoing description and examples have disclosed a process applicable to the treatment of hydrocarbon oil vapors which has a wide applicability and is capable of great variations in the methods of operation and the amounts of reagents employed. Therefore, the specific cases cited are not to be construed in a limiting sense upon the broad scope of the invention as many other modifications can be used and examples of results therefrom given.

We claim as our invention:

1. A step in the refining of the overhead products of hydrocarbon oil cracking, which comprises subjecting said products in heated vaporous condition to the action of sulphur dioxide, free oxygen and steam in the presence of a non-metallic solid contacting agent.

2. A step in the refining of the overhead products of hydrocarbon oil cracking, which comprises subjecting said products in heated vaporous condition to the action of sulphur dioxide, free oxygen and steam in the presence of bauxite.

3. A step in the refining of the overhead products of hydrocarbon oil cracking, which comprises subjecting said products in heated vaporous condition to the action of sulphur dioxide, free oxygen and steam in the presence of fuller's earth.

4. A step in the refining of the overhead products of hydrocarbon oil cracking, which comprises subjecting said products in heated vaporous condition to the action of sulphur dioxide, free oxygen and steam in the presence of a zeolite.

JACQUE C. MORRELL.
GUSTAV EGLOFF.